US012763608B2

(12) United States Patent
Balmakhtar et al.

(10) Patent No.: US 12,763,608 B2
(45) Date of Patent: Oct. 13, 2026

(54) DEVICE AND METHOD FOR CONTROLLING A PHYSICAL INDICATOR OF AN AMBIENT ELECTROMAGNETIC POWER HARVESTING DEVICE

(71) Applicant: T-Mobile Innovations LLC, Overland Park, KS (US)

(72) Inventors: Marouane Balmakhtar, Fairfax, VA (US); Galip Murat Karabulut, Vienna, VA (US); Lyle W. Paczkowski, Mission Hills, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 692 days.

(21) Appl. No.: 18/298,253

(22) Filed: Apr. 10, 2023

(65) Prior Publication Data

US 2024/0339867 A1 Oct. 10, 2024

(51) Int. Cl.

*H02J 50/20* (2016.01)
*G05B 15/02* (2006.01)
*G08B 21/18* (2006.01)

(52) U.S. Cl.

CPC .............. *H02J 50/20* (2016.02); *G05B 15/02* (2013.01); *G08B 21/18* (2013.01)

(58) Field of Classification Search

CPC ........ H02J 50/20; H02J 50/001; G05B 15/02; G08B 21/18; G06K 19/07705; G06K 19/07711; G06K 19/0709

See application file for complete search history.

(56) References Cited

U.S. PATENT DOCUMENTS 6,882,128 B1 4/2005 Rahmel et al.
7,652,577 B1 1/2010 Madhow et al.
(Continued)

FOREIGN PATENT DOCUMENTS

EP 2679503 A2 1/2014
EP 3875981 A2 9/2021
(Continued)

OTHER PUBLICATIONS

Office Action dated Apr. 30, 2020, U.S. Appl. No. 16/158,299, filed Oct. 12, 2018.
(Continued)

*Primary Examiner* — Thomas S McCormack

(57) ABSTRACT

An ambient electromagnetic power harvesting (AEPH) device having an indicator is provided. The AEPH device includes a substrate having fabricated thereon an antenna, an AEPH circuit, a controller, a physical indicator, and an indicator control data (ICD) memory. The AEPH circuit receives RF energy collected by the antenna and converts it into electrical power. The controller receives electrical power from the AEPH circuit and an RF signal from the antenna. The controller receives from an RF signal via the antenna information that includes interrogation data. The controller compares data stored in the ICD memory with the interrogation data to generate comparison information and causes the physical indicator to emit a physical signal that is based on the comparison information. A second AEPH device having a second antenna and a second AEPH circuit, where the indicator is mounted separate from the substrate.

20 Claims, 5 Drawing Sheets

(56) References Cited

U.S. PATENT DOCUMENTS

| | | | |
|---|---|---|---|
| 7,986,935 B1 | 7/2011 | D'Souza et al. | |
| 8,204,794 B1 | 6/2012 | Peng et al. | |
| 8,593,256 B2 | 11/2013 | Isabell | |
| 8,680,971 B2 | 3/2014 | Ito | |
| 8,941,469 B1 | 1/2015 | Diorio et al. | |
| 8,960,543 B2 | 2/2015 | Roedig et al. | |
| 9,256,881 B2 | 2/2016 | Engels et al. | |
| 9,411,992 B1 | 8/2016 | Marek et al. | |
| 9,894,471 B1 | 2/2018 | Zalewski et al. | |
| 10,676,240 B2 | 6/2020 | Logunov et al. | |
| 10,817,590 B1 | 10/2020 | Daly et al. | |
| 10,922,939 B1 | 2/2021 | Shakedd et al. | |
| 10,938,449 B1 | 3/2021 | Loman et al. | |
| 11,038,694 B1 | 6/2021 | Kleinman | |
| 11,213,773 B2 | 1/2022 | Okoro et al. | |
| 11,238,324 B1 | 2/2022 | Marquardt et al. | |
| 11,258,302 B1 | 2/2022 | Marquardt et al. | |
| 11,704,528 B2 | 7/2023 | Marquardt et al. | |
| 11,714,985 B1 | 8/2023 | Bales et al. | |
| 11,757,305 B2 | 9/2023 | Marquardt et al. | |
| 11,900,198 B2 | 2/2024 | Marquardt et al. | |
| 11,924,908 B1 | 3/2024 | Paczkowski et al. | |
| 11,946,766 B1 | 4/2024 | Volkerink et al. | |
| 12,073,417 B2 | 8/2024 | Chen | |
| 12,155,423 B1 | 11/2024 | Loman et al. | |
| 12,164,987 B2 | 12/2024 | Bales et al. | |
| 12,197,983 B2 | 1/2025 | Marquardt et al. | |
| 12,229,610 B2 | 2/2025 | Bales et al. | |
| 12,445,169 B2 | 10/2025 | Bales et al. | |
| 12,499,453 B2 | 12/2025 | Chen | |
| 12,541,659 B2 | 2/2026 | Balmakhtar et al. | |
| 2004/0155778 A1 | 8/2004 | Shek et al. | |
| 2005/0151617 A1 | 7/2005 | Nakazawa | |
| 2006/0071925 A1 | 4/2006 | Wykoff et al. | |
| 2006/0134580 A1 | 6/2006 | Raby et al. | |
| 2007/0085688 A1 | 4/2007 | Zhu et al. | |
| 2007/0205902 A1 | 9/2007 | Cote et al. | |
| 2008/0018467 A1 | 1/2008 | Estevez et al. | |
| 2008/0122631 A1 | 5/2008 | Kodukula et al. | |
| 2008/0126111 A1 | 5/2008 | Loda | |
| 2008/0129457 A1 | 6/2008 | Ritter et al. | |
| 2009/0096574 A1 | 4/2009 | Oberle | |
| 2009/0315686 A1 | 12/2009 | Oberle | |
| 2010/0090004 A1 | 4/2010 | Sands et al. | |
| 2010/0102123 A1 | 4/2010 | Skowronek | |
| 2010/0171586 A1* | 7/2010 | Park | G06K 19/0723 340/5.1 |
| 2011/0181399 A1 | 7/2011 | Pollack et al. | |
| 2011/0273273 A1 | 11/2011 | Liu | |
| 2012/0018505 A1 | 1/2012 | Jiang et al. | |
| 2012/0105210 A1 | 5/2012 | Smith et al. | |
| 2012/0126945 A1 | 5/2012 | Kim et al. | |
| 2012/0149300 A1 | 6/2012 | Forster | |
| 2013/0084796 A1 | 4/2013 | Kerr | |
| 2013/0320079 A1 | 12/2013 | Nordin et al. | |
| 2014/0044265 A1 | 2/2014 | Kocher et al. | |
| 2014/0134468 A1 | 5/2014 | Schaefer et al. | |
| 2014/0144994 A1* | 5/2014 | Conner | G06K 19/0723 235/492 |
| 2015/0048682 A1 | 2/2015 | Murley | |
| 2015/0069126 A1 | 3/2015 | Leon | |
| 2015/0326543 A1 | 11/2015 | Pochuev et al. | |
| 2017/0093896 A1 | 3/2017 | Poornachandran et al. | |
| 2017/0270323 A1 | 9/2017 | Butler et al. | |
| 2017/0277546 A1 | 9/2017 | Scholze et al. | |
| 2017/0329943 A1 | 11/2017 | Choi et al. | |
| 2017/0364720 A1 | 12/2017 | Kantor et al. | |
| 2018/0070224 A1 | 3/2018 | Park et al. | |
| 2018/0107914 A1 | 4/2018 | Ziola | |
| 2018/0337776 A1 | 11/2018 | Miller et al. | |
| 2019/0005283 A1 | 1/2019 | Nikitin et al. | |
| 2019/0034672 A1 | 1/2019 | Rokhsaz | |
| 2019/0121576 A1 | 4/2019 | Jean | |
| 2019/0138870 A1 | 5/2019 | Kuzbari et al. | |
| 2019/0149725 A1 | 5/2019 | Adato et al. | |
| 2019/0285724 A1 | 9/2019 | Meadow | |
| 2019/0347454 A1 | 11/2019 | Mongrenier et al. | |
| 2019/0354824 A1 | 11/2019 | Mohiuddin et al. | |
| 2019/0363746 A1 | 11/2019 | Zalewski et al. | |
| 2020/0004999 A1 | 1/2020 | Kawaguchi et al. | |
| 2020/0180935 A1 | 6/2020 | Zumtobel et al. | |
| 2020/0219112 A1 | 7/2020 | Nakayma et al. | |
| 2020/0227813 A1 | 7/2020 | Yehezkely | |
| 2020/0237032 A1* | 7/2020 | Berlips | A41D 19/0027 |
| 2020/0265285 A1* | 8/2020 | Paidimarri | G06K 7/0008 |
| 2020/0265446 A1 | 8/2020 | Vargas | |
| 2020/0313911 A1 | 10/2020 | Mondello et al. | |
| 2021/0019482 A1 | 1/2021 | Shakedd et al. | |
| 2021/0019585 A1 | 1/2021 | Shakedd et al. | |
| 2021/0027587 A1 | 1/2021 | Yeh et al. | |
| 2021/0126623 A1 | 4/2021 | Jeong | |
| 2021/0142013 A1 | 5/2021 | Kumar et al. | |
| 2021/0203496 A1 | 7/2021 | Cariello et al. | |
| 2021/0219102 A1 | 7/2021 | Gion et al. | |
| 2021/0224727 A1 | 7/2021 | Rakhunde et al. | |
| 2021/0280307 A1 | 9/2021 | Hargrove et al. | |
| 2021/0342559 A1 | 11/2021 | Frederick | |
| 2022/0043990 A1 | 2/2022 | Pandey et al. | |
| 2022/0078779 A1 | 3/2022 | Xu et al. | |
| 2022/0109667 A1 | 4/2022 | Gorog | |
| 2022/0121894 A1 | 4/2022 | Marquardt et al. | |
| 2022/0129721 A1* | 4/2022 | Kim | G06K 19/0723 |
| 2022/0171051 A1 | 6/2022 | Cristache et al. | |
| 2022/0180141 A1 | 6/2022 | Marquardt et al. | |
| 2022/0331841 A1 | 10/2022 | Filler et al. | |
| 2022/0344971 A1 | 10/2022 | Marquardt et al. | |
| 2022/0374030 A1 | 11/2022 | Lehtonen et al. | |
| 2022/0374621 A1 | 11/2022 | Biswas et al. | |
| 2023/0011005 A1 | 1/2023 | Khatri et al. | |
| 2023/0140778 A1 | 5/2023 | Abotabl et al. | |
| 2023/0187811 A1 | 6/2023 | Cohen et al. | |
| 2023/0306224 A1 | 9/2023 | Marquardt et al. | |
| 2023/0315913 A1 | 10/2023 | Chandra et al. | |
| 2023/0351406 A1 | 11/2023 | Marquardt et al. | |
| 2023/0359982 A1 | 11/2023 | Mohseni | |
| 2024/0015661 A1 | 1/2024 | Wang et al. | |
| 2024/0020502 A1 | 1/2024 | Marquardt et al. | |
| 2024/0047993 A1 | 2/2024 | Paczkowski et al. | |
| 2024/0047994 A1 | 2/2024 | Paczkowski et al. | |
| 2024/0088957 A1 | 3/2024 | Wang et al. | |
| 2024/0127022 A1 | 4/2024 | Marquardt et al. | |
| 2024/0265226 A1 | 8/2024 | Bales et al. | |
| 2024/0273313 A1 | 8/2024 | Wang et al. | |
| 2024/0330615 A1 | 10/2024 | Balmakhtar et al. | |
| 2024/0364145 A1 | 10/2024 | Balmakhtar et al. | |
| 2024/0394723 A1 | 11/2024 | Chen | |
| 2024/0405803 A1 | 12/2024 | Bales et al. | |
| 2025/0053769 A1 | 2/2025 | Bales et al. | |
| 2025/0094757 A1 | 3/2025 | Marquardt et al. | |
| 2025/0148249 A1 | 5/2025 | Bales et al. | |
| 2026/0005727 A1 | 1/2026 | Bales et al. | |
| 2026/0134237 A1 | 5/2026 | Balmakhtar et al. | |

FOREIGN PATENT DOCUMENTS

| | | | |
|---|---|---|---|
| EP | 4172863 | A1 | 5/2023 |
| EP | 4205031 | A1 | 7/2023 |
| EP | 4278425 | A1 | 11/2023 |
| EP | 4429076 | A1 | 9/2024 |
| EP | 4443327 | A1 | 10/2024 |
| EP | 4446939 | A1 | 10/2024 |
| EP | 4455934 | A1 | 10/2024 |
| EP | 4471660 | A1 | 12/2024 |
| EP | 4519805 | | 3/2025 |
| EP | 4537240 | | 4/2025 |
| EP | 4662581 | | 12/2025 |
| EP | 4760589 | A2 | 6/2026 |
| WO | 2008051598 | A1 | 5/2008 |
| WO | 2008055212 | A2 | 5/2008 |
| WO | 20110160007 | A2 | 12/2011 |
| WO | 2015187199 | A1 | 12/2015 |
| WO | 2018063449 | A1 | 4/2018 |
| WO | 2018132120 | A1 | 7/2018 |
| WO | 20190149341 | A1 | 8/2019 |

(56) References Cited

FOREIGN PATENT DOCUMENTS

| | | | |
|---|---|---|---|
| WO | 20200208412 | A1 | 10/2020 |
| WO | 2022060475 | A1 | 3/2022 |
| WO | 2022125162 | A1 | 6/2022 |
| WO | 2022231682 | A1 | 11/2022 |
| WO | 20220268331 | A1 | 12/2022 |
| WO | 20240167584 | A1 | 8/2024 |

OTHER PUBLICATIONS

Notice of Allowance dated Oct. 30, 2020, U.S. Appl. No. 16/158,299, filed Oct. 12, 2018.
Notice of Allowance dated Oct. 5, 2021, U.S. Appl. No. 17/024,484, filed Sep. 17, 2020.
Notice of Allowance dated Oct. 21, 2021, U.S. Appl. No. 17/240,846, filed Apr. 26, 2021.
Notice of Allowance dated Mar. 7, 2023, U.S. Appl. No. 17/568,019, filed Jan. 4, 2022.
Notice of Allowance dated May 3, 2023, U.S. Appl. No. 17/867,218, filed Jul. 18, 2022.
Office Action dated May 11, 2023, U.S. Appl. No. 17/161,415, filed Jan. 28, 2021.
Office Action dated Jun. 20, 2023, U.S. Appl. No. 17/115,596, filed Dec. 8, 2020.
Notice of Allowance dated May 11, 2023, U.S. Appl. No. 17/571,294, filed Jan. 7, 2022.
Foreign Communication From a Related Counterpart Application, International Search Report and Written Opinion dated Nov. 23, 2021, International Application No. PCT/US2021/044086 filed on Jul. 31, 2021.
Foreign Communication From a Related Counterpart Application, International Search Report and Written Opinion dated Dec. 6, 2021, International Application No. PCT/US2021/051159 filed on Sep. 20, 2021.
Foreign Communication From a Related Counterpart Application, Invitiation to Pay Additional Fees dated May 30, 2022, International Application No. PCT/US2022/017304.
Foreign Communication From a Related Counterpart Application, International Search Report and Written Opinion dated Jul. 21, 2022, International Application No. PCT/US2022/017304.
Foreign Communication From a Related Counterpart Application, International Search Report and Written Opinion dated May 3, 2023, International Application No. PCT/US2023/014517.
Loman, Clinton H., et al., "Battery Coupled Radio Frequency Identity (RFID)," filed Jan. 28, 2021, U.S. Appl. No. 17/161,415.
Marquardt, Ronald, R., et al., "Multi-tier Identities in an RFID Chip," filed Dec. 8, 2020, U.S. Appl. No. 17/115,596.
Marquardt, Ronald, R., et al., "RFID Device with Two-Stage Power Harvesting," filed Jul. 31, 2021, International Application No. PCT/US2021/044086.
Marquardt, Ronald, R., et al., "Multi-tier Identities in an RFID Chip," filed Sep. 20, 2021, International Application No. PCT/US2021/051159.
Marquardt, Ronald, R., et al., "Ambient Electromagnetic Power Harvesting Chip Adaptation Based on Available Power Level," filed Jan. 7, 2022, U.S. Appl. No. 17/571,294.
Marquardt, Ronald, R., et al., "Ambient Electromagnetic Power Harvesting Chip Adaptation Based on Available Power Level," filed Feb. 22, 2022, International Application No. PCT/US2022/017304.
Bales, Mark, R., et al., "System and Method of Controlling Unique Identities of Ambient Electromagnetic Power Harvesting Chips," filed Jul. 18, 2022, U.S. Appl. No. 17/867,218.
Bales, Mark, R., et al., "System and Method of Controlling Lifecycles of Ambient Electromagnetic Power Harvesting Chips," filed Feb. 7, 2023, U.S. Appl. No. 18/165,877 [Idf P20304US01 (4300-96800)].
Bales, Mark, R., et al., "System and Method of Controlling Unique Identities of Ambient Electromagnetic Power Harvesting Chips," filed Jun. 1, 2023, International Application No. PCT/US2023/067789.
Bales, Mark, R., et al., "System and Method of Controlling Unique Identities of Ambient Electromagnetic Power Harvesting Chips," filed Jun. 9, 2023, U.S. Appl. No. 18/332,284.
Balmakhtar, Marouane, et al., "Differentiated and Modulated Spectrum Power Radiation Via MIMO and Beamforming Imposed Upon Ambient Electromagnetic Power Harvesting Chips," filed Apr. 3, 2023, U.S. Appl. No. 18/295,075.
Chen, Zhisheng, "Anti-counterfeiting System for Bottled Products," filed May 2, 2022, U.S. Appl. No. 17/734,555.
Chen, Zhisheng, "Anti-counterfeiting System for Bottled Products," filed Mar. 3, 2023, International Application No. PCT/US2023/014517.
Foreign Communication From a Related Counterpart Application, EP Extended Search Report and EP Search Opinion dated Aug. 16, 2024, EP Application No. 24165554.7.
Foreign Communication From a Related Counterpart Application, EP Extended Search Report and EP Search Opinion dated Sep. 2, 2024, EP Application No. 24165153.8.
Foreign Communication From a Related Counterpart Application, EP Extended Search Report and EP Search Opinion dated Sep. 18, 2024, EP Application No. 24169545.1.
Foreign Communication From a Related Counterpart Application, EP Extended Search Report and EP Search Opinion dated Oct. 15, 2024, EP Application No. 24175267.4.
Bales, Mark R., et al., "System and Method of Controlling Unique Identities of Ambient Electromagnetic Power Harvesting Chips," filed Oct. 28, 2024, U.S. Appl. No. 18/929,569.
Balmakhtar, Marouane, et al., "Location Detection and Tracking Using Ambient Electromagnetic Power Harvesting," filed Apr. 25, 2023, U.S. Appl. No. 18/306,934.
Notice of Allowance dated Jun. 18, 2025, U.S. Appl. No. 18/325,936, filed May 30, 2023.
Office Action dated Jun. 30, 2025, U.S. Appl. No. 18/306,934, filed Apr. 25, 2023.
Ponnimbaduge, T.D., et al. "Simultaneous Wireless Information and Power Transfer (SWIPT): Recent Advances and Future Challenges." IEEE Communications Surveys & Tutorials, vol. 20, No. 1, pp. 264-302, 2018.
Office Action dated Oct. 17, 2023, U.S. Appl. No. 17/165,877, filed Feb. 7, 2023.
Marquardt, Ronald, R., et al., "Multi-tier Identities in an RFID Chip," filed Dec. 20, 2023, U.S. Appl. No. 18/325,936.
Notice of Allowance and Fee(s) dated Jul. 18, 2024, U.S. Appl. No. 17/161,415, filed Jan. 28, 2021.
Notice of Allowance dated Jul. 30, 2024, U.S. Appl. No. 18/332,284, filed Jun. 9, 2023.
Chen, Zhisheng, "Anti-counterfeiting System for Bottled Products," filed Jul. 12, 2024, U.S. Appl. No. 18/772,096.
Restriction Requirement dated Apr. 1, 2025, U.S. Appl. No. 18/295,075, filed Apr. 3, 2023.
Office Action dated Aug. 11, 2025, U.S. Appl. No. 18/295,075, filed Apr. 3, 2023.
Notice of Allowance dated Oct. 9, 2025, U.S. Appl. No. 18/295,075, filed Apr. 3, 2023.
Notice of Allowance dated Aug. 22, 2025, U.S. Appl. No. 18/772,096, filed Jul. 12, 2024.
Office Action dated Oct. 16, 2025, U.S. Appl. No. 18/391,627, filed Dec. 20, 2023.
Office Action dated Sep. 14, 2023, U.S. Appl. No. 17/161,415, filed Jan. 28, 2021.
Notice of Allowance dated Sep. 27, 2023, U.S. Appl. No. 17/115,596, filed Dec. 8, 2020.
Foreign Communication From a Related Counterpart Application, International Search Report and Written Opinion dated Sep. 26, 2023, International Application No. PCT/US2023/067789.
Marquardt, Ronald, R., et al., "RFID Device with Two-Stage Power Harvesting," filed May 24, 2023, U.S. Appl. No. 18/323,268.
"Bales, Mark, R., et al., "Ambient Electromagnetic Power Harvesting Device for Collecting and Forwarding Data," filed May 30, 2023, U.S. Appl. No. 18/325,936."
Office Action dated Jan. 8, 2024, U.S. Appl. No. 17/734,555, filed May 2, 2022.

(56) References Cited

OTHER PUBLICATIONS

Final Office Action dated Apr. 1, 2024, U.S. Appl. No. 17/161,415, filed Jan. 28, 2021.
Office Action dated Apr. 8, 2024, U.S. Appl. No. 17/165,877, filed Feb. 7, 2023.
Tahir, M., et al. "An Approach for Managing Manufacturing Assets through Radio Frequency Energy Harvesting". Future and Automation Systems and Technologies Laboratory, Jan. 2019.
Notice of Allowance dated Apr. 19, 2024, U.S. Appl. No. 17/734,555, filed May 2, 2022.
Notice of Allowance dated Oct. 15, 2024, U.S. Appl. No. 17/165,877, filed Feb. 7, 2023.
Notice of Allowance dated Sep. 13, 2024, U.S. Appl. No. 18/323,268, filed May 24, 2023.
Marquardt, Ronald, R., et al., "RFID Device with Two-Stage Power Harvesting," filed Dec. 3, 2024 U.S. Appl. No. 18/967,600.
Bales, Mark, R., et al., "System and Method of Controlling Lifecycles of Ambient Electromagnetic Power Harvesting Chips," filed Jan. 10, 2025 , U.S. Appl. No. 19/017,214.
Final Office Action dated Nov. 19, 2025, U.S. Appl. No. 18/306,934, filed Apr. 25, 2023.
Advisory Action dated Feb. 6, 2026, U.S. Appl. No. 18/306,934, filed Apr. 25, 2023.
Office Action dated Dec. 31, 2025, U.S. Appl. No. 19/017,214, filed Jan. 10, 2025.
Woolley, M. (Oct. 26, 2017). "Bluetooth Core Specification Version 5.0 Feature Enhancements". bluetooth.com (1.1.0 ed.)., [online] Retrieved from the internet: <https://web.archive.org/web/20190718114224/https://www.bluetooth.com/wp-content/uploads/2019/03/Bluetooth_5-Final.pdf>, 2017.
Bales, Mark, R., et al., "Ambient Electromagnetic Power Harvesting Device for Collecting and Forwarding Data," filed Sep. 6, 2025, U.S. Appl. No. 19/321,172.
Balmakhtar, Marouane, et al., "Differentiated and Modulated Spectrum Power Radiation Via MIMO and Beamforming Imposed Upon Ambient Electromagnetic Power Harvesting Chips," filed Jan. 9, 2026, U.S. Appl. No. 19/445,403.
Office Action dated Feb. 19, 2026, U.S. Appl. No. 18/967,600, filed Dec. 3, 2024.
Office Action dated Feb. 19, 2026, U.S. Appl. No. 18/929,569, filed Oct. 28, 2024.
Final Office Action dated Mar. 24, 2026, U.S. Appl. No. 18/391,627, filed on Dec 20, 2023.
Notice of Allowance dated Jun. 2, 2026, U.S. Appl. No. 18/391,627, filed on Dec 20, 2023.
Notice of Allowance dated Jun. 5, 2026, U.S. Appl. No. 18/967,600, filed on Dec 3, 2024.
Foreign Communication From a Related Counterpart Application, EP Extended Search Report and EP Search Opinion dated May 19, 2026, EP Application No. 26152454.0.
Notice of Allowance dated Jul. 22, 2026, U.S. Appl. No. 19/017,214, filed on Jan. 10, 2025.
Notice of Allowance dated Jul. 14, 2026, U.S. Appl. No. 18/929,569, filed on Oct. 28, 2024.

* cited by examiner

DEVICE AND METHOD FOR CONTROLLING A PHYSICAL INDICATOR OF AN AMBIENT ELECTROMAGNETIC POWER HARVESTING DEVICE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Some wireless identification (ID) tags respond to a radio frequency (RF) signal from a reader device by emitting an RF response signal. Some wireless identification tags have a battery or other power storage component, while other such tags harvest power from an ambient electromagnetic field. Some wireless identification tags emit an RF response signal in response to a signal comprising predetermined data, while other wireless identification tags emit an RF response signal in response to detecting RF radiation in a predetermined RF frequency band. Some such wireless identification tags are referred to as RFID tags.

SUMMARY

In an embodiment, a first indicator ambient electromagnetic power harvesting (AEPH) device is disclosed. The first indicator AEPH device comprises a substrate, having fabricated thereon an antenna, an AEPH circuit, a controller, a physical indicator, and an indicator control data (ICD) memory. The AEPH circuit is coupled to the antenna and configured to receive RF energy that is collected by the antenna and to convert the RF energy into electrical power. The controller is configured to receive electrical power from the AEPH circuit and an RF signal from the antenna. The physical indicator is configured to be controlled by the controller. The ICD memory is coupled to the controller. The controller is configured to receive information from an RF signal that is received via the antenna, where the information comprises interrogation data; compare data stored in the ICD memory with the interrogation data to generate comparison information; and cause the physical indicator to emit a physical signal, based on the comparison information.

In another embodiment, a second indicator AEPH device is disclosed. The second indicator AEPH device comprises a substrate, having fabricated thereon a first antenna, a first AEPH circuit, a controller, and an ICD memory. The first AEPH circuit is coupled to the first antenna and configured to receive first RF energy that is collected by the first antenna and to convert the first RF energy into first electrical power. The controller is configured to receive the first electrical power from the AEPH circuit and an RF signal from the first antenna. The ICD memory is coupled to the controller. The second indicator AEPH device further comprises a second antenna, a second AEPH circuit, and a physical indicator. The second AEPH circuit is coupled to the second antenna and configured to receive second RF energy collected by the second antenna and convert the second RF energy into second electrical power. The physical indicator is configured to be powered by the second AEPH circuit and controlled by the controller. The controller is configured to receive information from an RF signal received via the first antenna, the information comprising interrogation data; compare data stored in the ICD memory with the interrogation data to generate comparison information; and cause the physical indicator to emit a physical signal, based on the comparison information.

In yet another embodiment, a method of responding to a radio signal by an indicator AEPH device is disclosed. The method comprises receiving, by a controller of an indicator AEPH, an RF signal, the RF signal comprising interrogation data; comparing, by the controller, the interrogation data with data stored in an indicator control data (ICD) memory coupled to the controller to generate comparison information; and causing, by the controller, a physical indicator coupled to the controller to emit a physical signal, where a physical characteristic of the physical signal is based on the comparison information.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
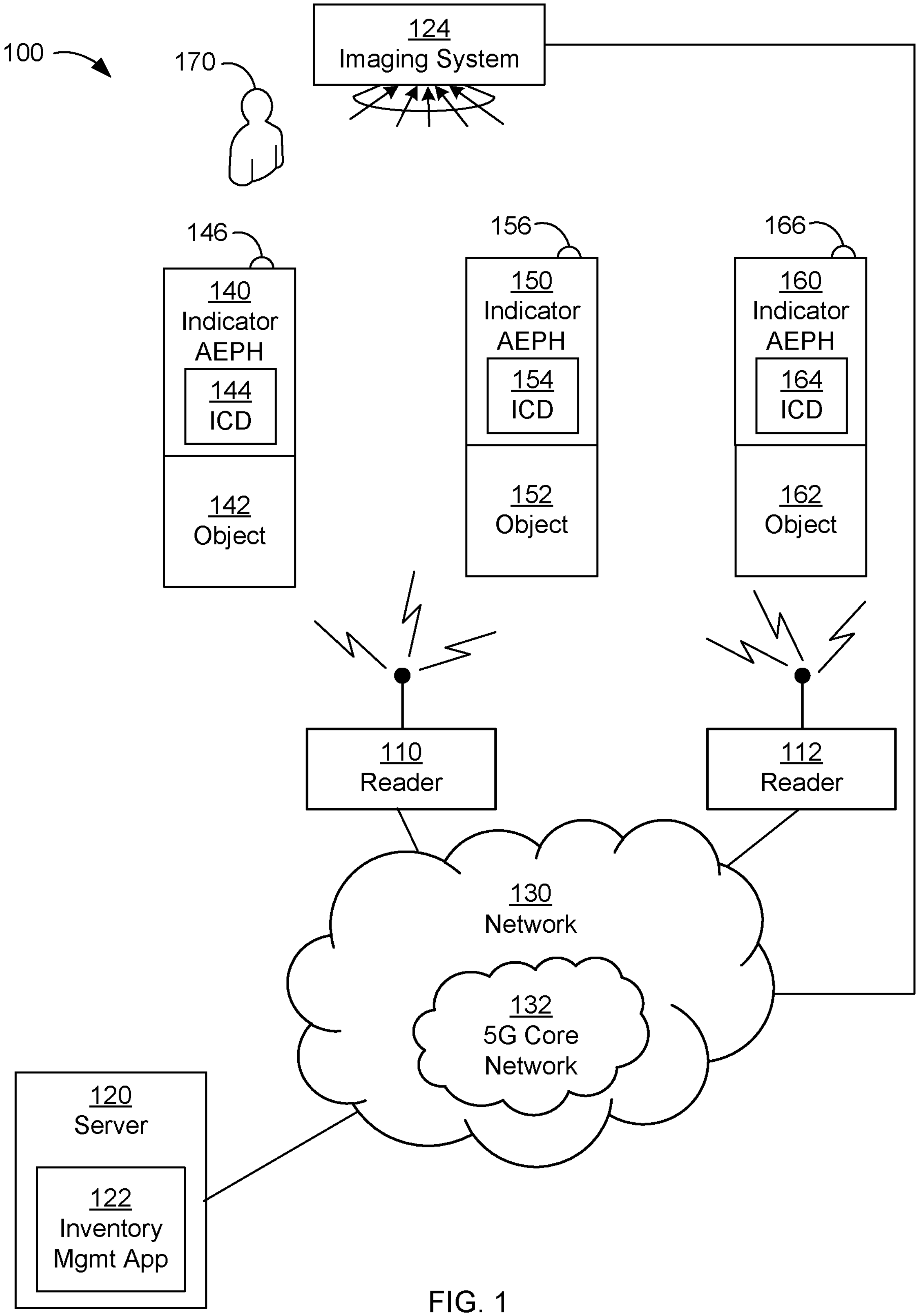
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

If current wireless ID tags respond to interrogation by a reader device, they do so by emitting an RF signal. If the information sought by the reader device can be encoded in the response signal, then the reader-tag transaction may be complete. However, if the information sought by the reader is a count of the number of responding tags (for example, for inventory purposes), the reader may have to send multiple interrogations and receive multiple responses to determine the number of responding tags. If the information sought by the reader is a physical location of the responding tag (for example, for order-picking purposes), the reader may require one or more sensors to determine, for example, a direction and distance from the reader to the responding tag.

Thus, applications that count and/or locate wireless ID tags have the problem of being time consuming, and applications that locate wireless ID tags have the added problem of utilizing a more complex and expensive reader device than simple call-and-response wireless ID tag applications. Indicator ambient electromagnetic power harvesting (AEPH) devices according to the disclosure solve those problems by providing wireless ID tags that can respond to an interrogation with a physical indication—for example, a visual indication (that is, 300 gigahertz (GHz) or above) or an auditory indication (that is, 20-20,000 hertz (Hz)). For counting applications, a person or a device having a camera (e.g., a mobile, fixed, hybrid, or handheld device, a smart phone, smart-tablet, or personal digital assistant) may observe visual indicator AEPHs from one or more locations and count the number of AEPHs that are responding to an interrogation. For location applications, a person or mobile camera system (for example, an order-picking robot) may detect from a distance a visual or auditory indicator AEPH that is responding to an interrogation and move to the location of the detected indicator AEPH. Where a mobile or fixed camera system is used, a visual indicator may emit non-visible radiation (e.g., infrared or ultraviolet) that is sensed by the camera system but is not perceived by human workers in the area.

In all applications, a responding indicator AEPH may provide a response using both its indicator and an RF response signal. In counting or location applications, an electromagnetic radiation (EMR) sensing system in a reader device or mobile camera system may provide an initial, general indication of a location of a responding indicator AEPH, which a person or mobile camera system follows until the physical indicator of the responding indicator AEPH can be sensed directly.

A first use for such indicator AEPHs is in a warehouse where a distributor seeks to determine how many items of a specified product type from a specified manufacturer are in the warehouse. A reader device sends an interrogation signal that includes information such as the manufacturer and product type being inventoried, causing all indicator AEPHs having that manufacturer and product type stored in local memory to light up a visual indicator. A person or camera system may then observe the entire warehouse or individual subsections of the warehouse to count the number of indicator AEPHs that have responded to the interrogation and report (or record for later reporting) the counted number of responding AEPHs. The counting process may be triggered when the person or camera system receives the interrogation signal. Where the visual indicator comprises a plurality of emitters of different colors of light, an indicator AEPH may signal information to the camera system observing the indicator AEPHs by a selected number or combination of emitters that it causes to emit in response to the interrogation signal.

Where a container (or package) in a warehouse contains multiple individual items, a problem may arise that some or all indicator AEPHs on such items are visible or audible from outside the container. In such situations, an embodiment of the disclosure could solve such a problem by providing a two-tiered system, wherein the container comprises a collector (or intermediate) indicator AEPH that receives responses from indicator AEPHs (or conventional RFID tags) on the items it contains, counts the responses, and produce its own visual or audible response based on the aggregate value of the internal responses received. Such an response could include a numeric display of the aggregate value, a light having a frequency that is based on the aggregate value, a light blinking in a pattern that is based on the aggregate value, a voice speaking the aggregate value, or a sound emitted in a pattern that is based on the aggregate value.

A second use for such indicator AEPHs is in a warehouse where products in an order are collected for shipment. A reader sends one or more interrogation signals that include information identifying the products that are included in the order. Indicator AEPHs on the products or on bins containing the products emit light or sound signals identifying themselves, enabling employees or robots to move around the warehouse to collect the products for the order. More than one order may be collected at the same time by using indicator AEPHs that are configured to emit light of more than one color or audio tones of more than one frequency or modulation pattern. Single color or audio frequency emitters may enable multi-order collection by emitting their physical signal in corresponding multiple on-off patterns.

A third use for such indicator AEPHs is in a store to guide a shopper to a product having specified characteristics. For example, in a shoe store, a customer may be looking for a pair of size 12 shoes with leather uppers and rubber soles. A store attendant may enter the desired characteristics in a reader device to be sent as information in an interrogation signal to indicator AEPHs attached to shoe boxes in the store. Each indicator AEPH stores in local memory information relating to the characteristics of the shoes in its box. When the indicator AEPHs receive the interrogation signal, they compare the information in the interrogation signal with the information stored in its local memory and activates its indicator based on the results of the comparison.

Where the indicator is a visual indicator, a color or brightness of the light the indicator emits may be used to indicate a degree of similarity between the stored information and the information in the interrogation signal. For example, a green light may indicate a match of all information, a red light to indicate a match of only a few characteristics, and a yellow light to indicate a match of an intermediate number of characteristics. Where the indicator comprises a plurality of emitters, each emitting a different color of light, the degree of similarity may be used to select a number of emitters to cause to emit light. A camera system may be used to identify which emitters are emitting (or not emitting) light, enabling the communication of binary information having a bit depth equaling the number of emitters. Indicator AEPHs whose stored information matches none of the information in the interrogation signal may emit no light.

Turning now to FIG. 1, a communication system 100 according to the disclosure is described. In an embodiment, the system 100 comprises readers 110 and 112, a server 120, and in some embodiments an imaging system 124. These elements of the system 100 communicate wired or wirelessly via a network 130. The network 130 may be one or more public networks, one or more private networks, or a combination thereof. The network 130 may comprise or be coupled to a 5G core network 132 or, in other embodiments, a 4G or 4G Long Term Evolution (LTE) network.

The system further includes indicator AEPHs 140, 150, and 160, which communicate with the readers 110 and 112 via RF signals and with the imaging system 124 and/or a user 170 via physical indicators 146, 156, and 166, respectively. The indicator AEPHs 140, 150, and 160 are physically coupled to objects 142, 152, and 162, respectively. The indicator AEPHs 140, 150, and 160 comprise respective stored indicator control data (ICD) 144, 154, and 164.

In an embodiment, one or both of the readers 110 and 112 may communicate with one or more of the indicator AEPHs

140, 150, and 160 using an RF frequency range allocated for cellular communication, for example a cellular radio frequency in the 2.4 gigahertz (GHz) to 2.6 GHz frequency range. In an embodiment, one or more of the indicator AEPHs 140, 150, and 160 may harvest electromagnetic energy from a cellular RF frequency range, for example from a cellular radio frequency in the 2.4 GHz to 2.6 GHz frequency range. In an embodiment, one or more of the indicator AEPHs 140, 150, and 160 may harvest electromagnetic energy from a RF frequency range of 2.495 GHz to 2.5 GHz. In an embodiment, one or both of the readers 110 and 112 may communicate with one or more of the indicator AEPHs 140, 150, and 160 using one or more frequency ranges, such as 3-30 megahertz (MHz), 433 MHz, 860-960 MHz, 2.45 GHZ, 2.496 GHz, and 5.8 GHz.

In an inventory management example, one or both of the readers 110 and 112 send an interrogation signal to the indicator AEPHs 140, 150, and 160 that includes interrogation information. The indicator AEPHs 140, 150, and 160 compare their respective ICDs 144, 154, and 164 to the interrogation information to generate comparison information and cause their respective physical indicators 146, 156, and 166 to emit a physical signal (as described above, (i.e., a visual signal at 300 GHz or above) or an auditory signal (i.e., 20-20,000 Hz), based on the comparison information. In some embodiments, where the physical signal is a visual or auditory signal, the user 170 may use eyes or ears to locate one or more indicator AEPHs 140, 150, and 160 that are emitting the physical signal. Where the physical signal is a visual signal and there are more than three indicator AEPHs, the user 170 may count the responding indicator AEPHs while viewing all the indicator AEPHs or view subsets of the indicator AEPHs and count the responding indicator AEPHs in each subset. Similarly, where the physical signal is a visual signal, the imaging system 124 may obtain one or more images of the responding indicator AEPHs and send the images to an inventory management application 122 in the server 120 to be image processed in order to count the responding indicator AEPHs.

In an order-picking example, one or both of the readers 110 and 112 send an interrogation signal to the indicator AEPHs 140, 150, and 160 that includes interrogation information that includes one or more product identifiers associated with the order. The indicator AEPHs 140, 150, and 160 have stored in their respective ICDs 144, 154, and 164 information identifying the product (or products in the bin) to which they are attached. The indicator AEPHs 140, 150, and 160 compare their respective ICD to the interrogation information and cause their respective physical indicators 146, 156, and 166 to emit a physical signal based on a match between their ICD and one or more of the product identifiers in the interrogation information. Whether the physical signal is a visual or auditory signal, the user 170 may scan the warehouse shelves to locate the physical signals indicating products identified in the interrogation information.

In a retail shopping example, the user 170 provides information to the system 100 indicating one or more desired characteristics of a product. In response, one or both of the readers 110 and 112 send an interrogation signal to the indicator AEPHs 140, 150, and 160 that includes interrogation information relating to the desired product characteristics. The indicator AEPHs 140, 150, and 160 have stored in their respective ICDs 144, 154, and 164 information relating to characteristics of the product to which they are attached. The indicator AEPHs 140, 150, and 160 compare their respective ICD to the interrogation information and cause their respective physical indicators 146, 156, and 166 to emit a physical signal based on a similarity metric calculated using the ICD and the interrogation information. Whether the physical signal is a visual or auditory signal, the user 170 may look over the retail inventory to find products that most closely match their desired product characteristics.

Figure 2:
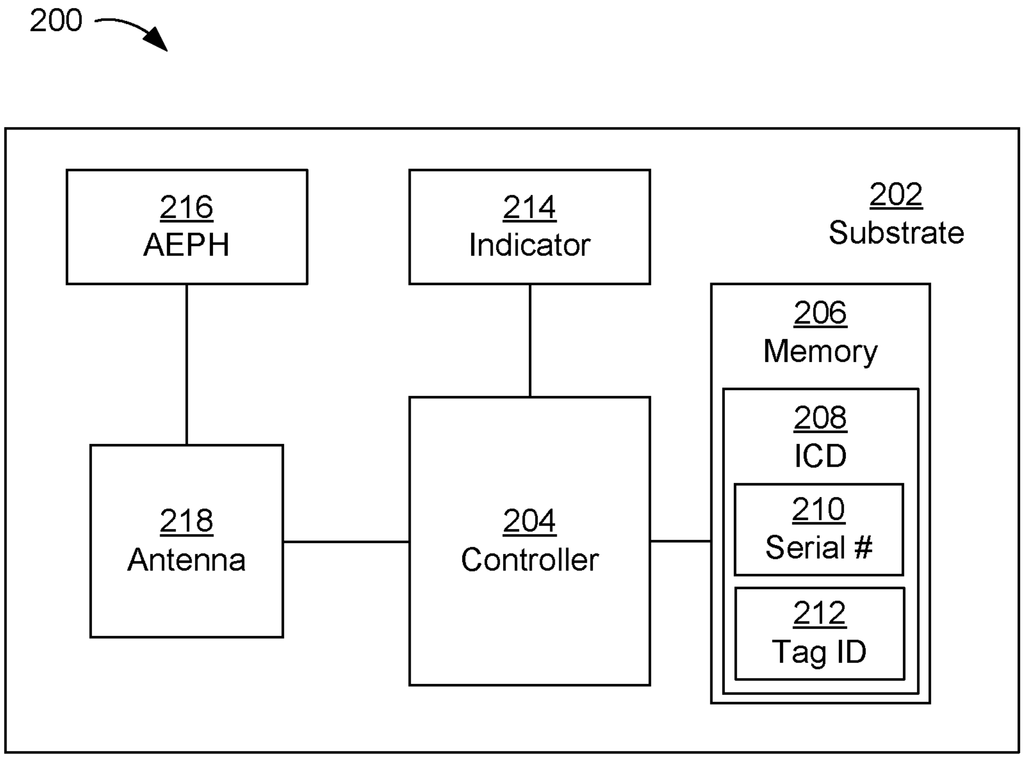
FIG. 2 is a block diagram of an indicator AEPH according to a first embodiment of the disclosure.

FIG. 2 is a block diagram of an indicator AEPH 200 according to a first embodiment of the disclosure. The indicator AEPH 200 may also be referred to as an indicator wireless ID tag. The indicator AEPH 200 includes a substrate 202, on which are fabricated a controller 204, a memory 206, a physical indicator 214, an AEPH circuit 216, and an antenna 218. In an embodiment, the antenna may be physically separate from the substrate 202, that is may not be fabricated on the substrate 202. The memory 206 includes ICD memory 208, which includes a serial number 210 (to distinguish the indicator AEPH 200 from other indicator wireless ID tags) and a tag ID 212 (a value chosen by the manufacturer or purchaser of the indicator AEPH 200). The ICD memory 208 may include other data, such as one or more product identifiers and/or information relating to characteristics of a product to which the indicator AEPH 200 is attached. Some data in the ICD memory 208 may be programmable by a user of the indicator AEPH 200.

In an embodiment, the antenna 218 (whether separate from or fabricated on the substrate 202) is electrically coupled to the controller 204 and the AEPH circuit 216. The AEPH circuit 216 receives RF energy and—in a process referred to as ambient electromagnetic power harvesting—converts the RF energy to electrical power for one or more of the controller 204, the memory 206, and/or the physical indicator 214. The controller also receives RF energy from the antenna 218 and converts the energy in a predetermined frequency range to a signal comprising encoded information.

The controller 204 is also electrically coupled to the physical indicator 214 and configured to cause the physical indicator 214 to emit a physical signal. In some embodiments, the indicator 214 is a light-emitting diode (LED) or other component that emits light. In other embodiments, the physical indicator 214 is an audio transducer that emits a sound. The controller 204 is configured to cause the physical indicator 214 to begin or cease emitting the physical signal. In some embodiments, the controller 204 is configured to control a physical characteristic of the physical signal emitted by the physical indicator 214, for example, the color, brightness, or modulation thereof of an emitted light or the frequency, amplitude, or modulation thereof of an emitted sound. In some embodiments, the physical indicator 214 comprises both a light emitter and an audio transducer.

The controller 204 is configured to receive via the antenna 218 an RF signal that includes interrogation data, compare data stored in the ICD memory 208 with the interrogation data to generate comparison information, and cause the physical indicator 214 to emit a physical signal, based on the comparison information. In some embodiments, generating the comparison information comprises calculating a similarity metric based on the data stored in the ICD memory 208 and the interrogation data. Causing the physical indicator 214 to emit the physical signal may be based on a value of the similarity metric. The value of the similarity metric represents a measure of similarity between the data stored in the ICD memory 208 and the interrogation data. In some embodiments the value of the similarity measure may be a first value if the interrogation data matches the data stored in the ICD memory 208 and a second value otherwise. In other embodiments, the data stored in the ICD memory 208 comprises a plurality of data items and the value of the similarity metric is based on a determination that the interrogation data matches one of the data items. In other embodiments, where the interrogation data comprises a first plurality of data items and the data stored in the ICD memory 208 comprises a second plurality of data items, the value of the similarity measure may be based on a number of data items in the first plurality of data items that match data items in the second plurality of data items.

Figure 3:
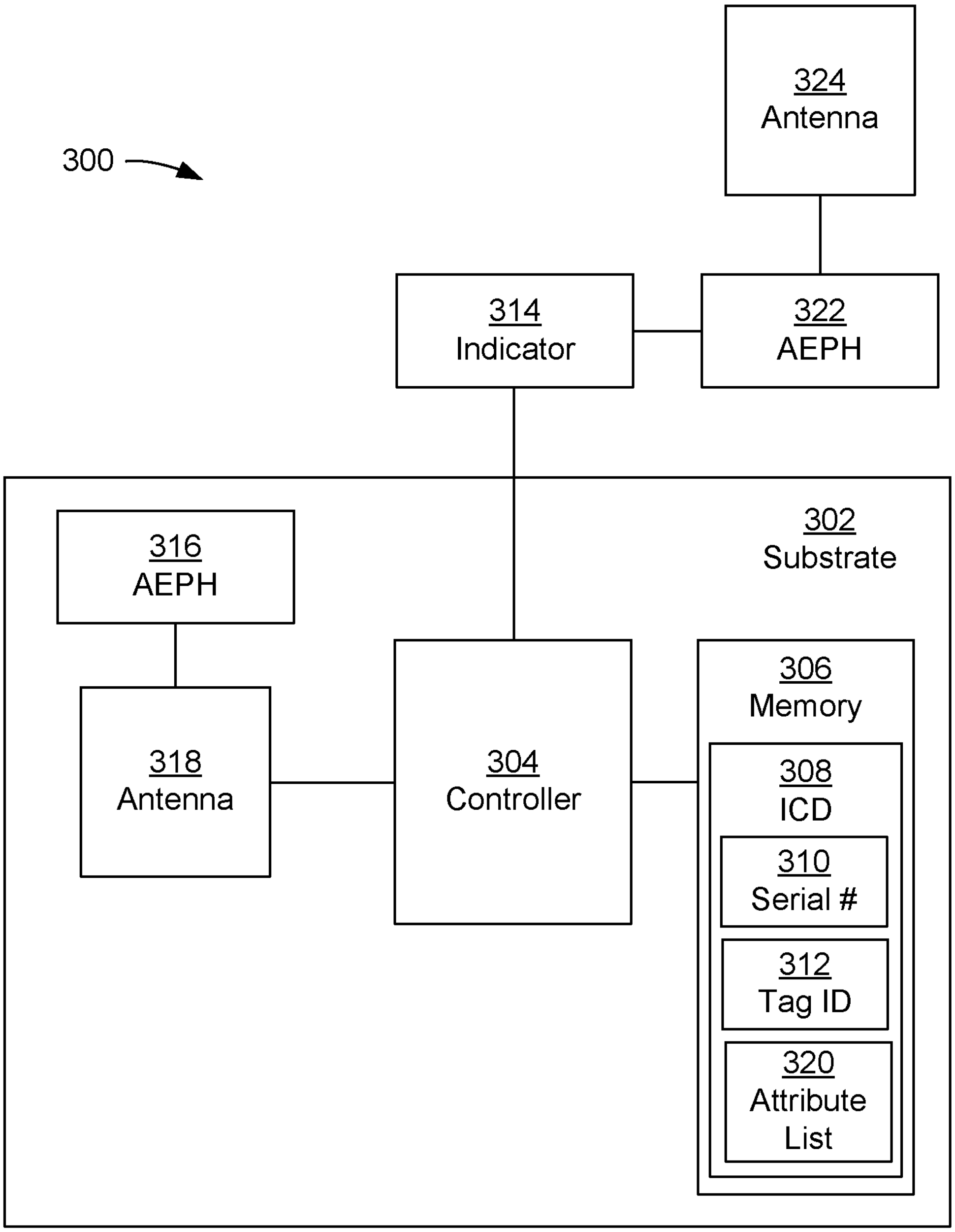
FIG. 3 is a block diagram of an indicator AEPH according to a second embodiment of the disclosure.

FIG. 3 is a block diagram of an indicator AEPH 300 according to a second embodiment of the disclosure. As for the indicator 200 described with reference to FIG. 2, the indicator AEPH 300 includes a substrate 302, on which are fabricated a controller 304, a memory 306, an AEPH circuit 316, and an antenna 318. The memory 306 includes ICD memory 308, which includes a serial number 310 and a tag ID 312. In some embodiments, the ICD memory 308 further includes an attribute list 320 that comprises a plurality of data items. Unlike the indicator AEPH 200, the indicator AEPH 300 includes, separate from the substrate 302, a physical indicator 314, a second AEPH circuit 322, and a second antenna 324.

The antenna 324 is electrically coupled to the AEPH circuit 322. The AEPH circuit 322 receives RF energy and converts the RF energy to electrical power for the physical indicator 314. The controller 304 is electrically coupled to the physical indicator 314 and configured to cause the physical indicator 314 to emit a physical signal. As described for the indicator AEPH 200, in various embodiments, the physical indicator 214 comprises either or both a light emitter and an audio transducer.

The antenna 318 and the AEPH 316 may be configured to respond to RF energy in a first frequency range—for example, a range used by conventional RFID tags, such as 3-30 MHz, 433 MHz, or 860-960 MHz. The antenna 324 and the AEPH 322 may be configured to respond to RF energy in a second frequency range—for example, a range used by cellphones, such as 2.45 GHz, 2.496 GHz, and 5.8 GHz. Governmental or other regulations may limit an RF power level at which signals in a frequency range may be transmitted. As a result, for example, the antenna 324 and the AEPH 322 may receive RF energy at a higher RF power level, enabling the AEPH circuit 322 to harvest and provide to the physical indicator 314 more electrical power than the AEPH circuit 316 can provide to the components on the substrate 302. Such additional electrical power may allow the physical indicator 314 to emit a brighter light or a louder sound than a physical indicator powered by the AEPH circuit 316.

In various embodiments, the indicator AEPH 200 and/or the indicator AEPH 300 may further include a battery, a capacitor, or other power storage device. Such a power storage device may be used, for example, when received RF energy is sufficient for RF communication but not (or not quite) sufficient for operation of the physical indicator 214 or 314.

Figure 4:
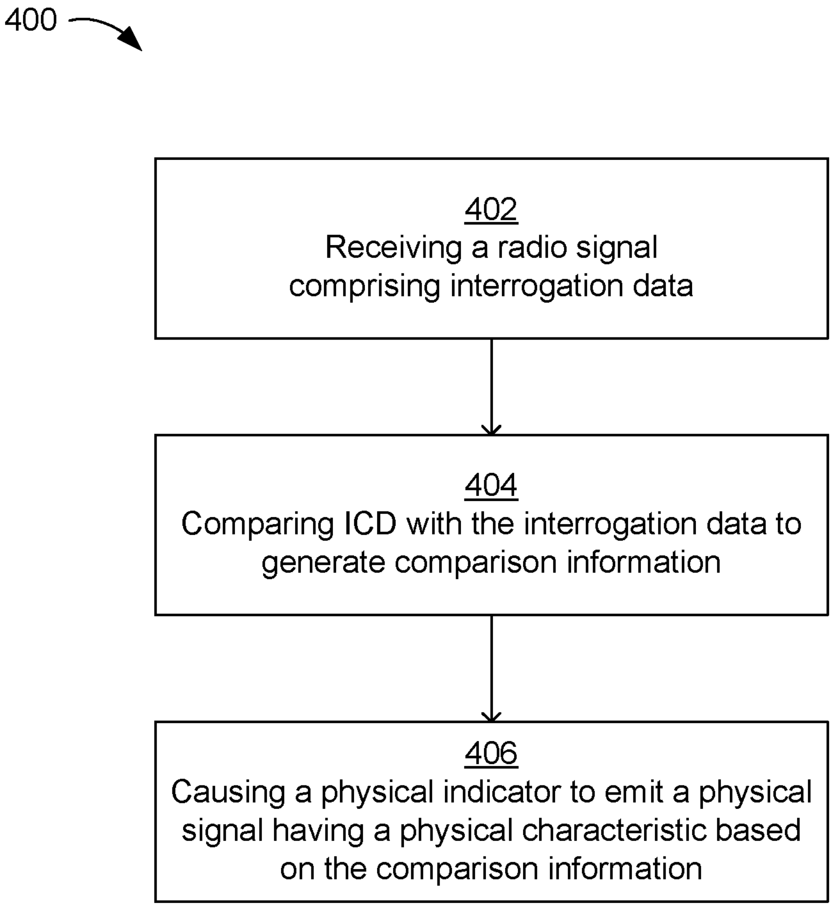
FIG. 4 is a flow chart of a method 400 according to an embodiment of the disclosure.

FIG. 4 is a flow chart of a method 400 according to an embodiment of the disclosure. The method 400 is described below with reference to the indicator AEPH 200, but may also be performed by the indicator AEPH 300.

In step 402, the controller 204 receives, via the antenna 218, a radio signal, the radio signal that includes interrogation data. In step 404, the controller 204 compares information stored in the ICD memory 208 with the interrogation data to generate comparison information. In step 406, the controller 204 causes the physical indicator 214 to emit a physical signal, where a physical characteristic of the physical signal is based on the comparison information.

In some embodiments, the physical indicator 214 is a light-emitting device and the physical signal comprises light emitted by the light-emitting device. In some embodiments, a brightness of the emitted light is based on the comparison information. In other embodiments, a color of the emitted light is based on the comparison information. In some embodiments, the comparison information comprises a value of a similarity metric calculated based on the information stored in the ICD memory 208 and the interrogation data and the physical characteristic of the physical signal is based on a value of the similarity metric. In some such embodiments, the information stored in the ICD memory 208 comprises a plurality of data items and the value of the similarity metric is based on a determination that the interrogation data matches one data item of the plurality of data items. In other such embodiments, the interrogation data comprises a first plurality of data items, the information stored in the ICD memory 208 comprises a second plurality of data items, and the value of the similarity metric is based on a number of data items in the first plurality of data items that match data items in the second plurality of data items.

Figure 5:
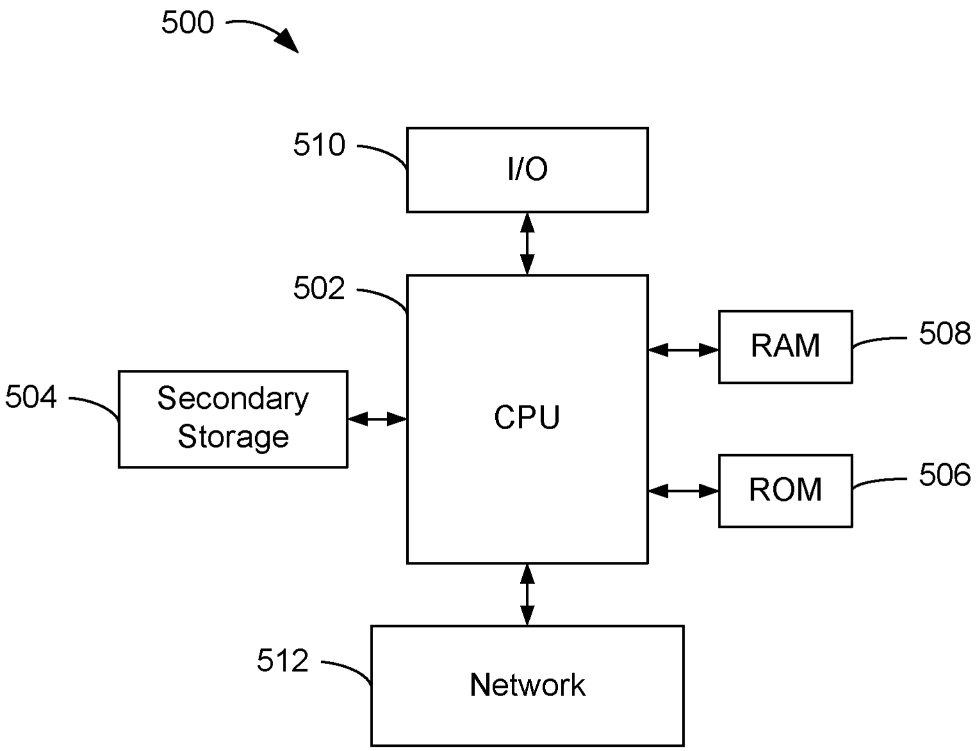
FIG. 5 is a block diagram or a hardware architecture of a device according to an embodiment of the disclosure.

FIG. 5 is a block diagram or a hardware architecture of a device 500 according to an embodiment of the disclosure. The device 500 may be suitable for implementing at least portions of the indicator AEPH 200 and the indicator AEPH 300. The device 500 includes a processor 502 (which may be referred to as a central processor unit or CPU) that is in communication with memory devices including secondary storage 504, ROM 506, and RAM 508. The processor 502 is also in communication with input/output (I/O) devices 510 (for example, a control interface to the physical indicators 214 and 314), and network connectivity devices 512 (for example, a modulation circuit and a demodulation circuit that couple to the antennas 218 and 318). The processor 502 may be implemented as one or more CPU chips.

The controllers 204 and 304 comprise any or all of the processor 502, secondary storage 504, ROM 506, RAM 508, and I/O devices 510. The memories 206 and 306 comprise any or all of the secondary storage 504, ROM 506, and RAM 508.

It is understood that by programming and/or loading executable instructions onto the device 500, at least one of the CPU 502, the RAM 508, and the ROM 506 are changed, transforming the device 500 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 500 is turned on or booted (for example, by receiving electrical power from the AEPH 216 or 316), the CPU 502 may execute a computer program or application. For example, the CPU 502 may execute software or firmware stored in the ROM 506 or stored in the RAM 508. In some cases, on boot and/or when the application is initiated, the CPU 502 may copy the application or portions of the application from the secondary storage 504 to the RAM 508 or to memory space within the CPU 502 itself, and the CPU 502 may then execute instructions that the application is comprised of. During execution, an application may load instructions into the CPU 502, for example load some of the instructions of the application into a cache of the CPU 502. In some contexts, an application that is executed may be said to configure the CPU 502 to do something, e.g., to configure the CPU 502 to perform the function or functions promoted by the subject application. When the CPU 502 is configured in this way by the application, the CPU 502 becomes a specific purpose computer or a specific purpose machine.

The secondary storage 504 is used for non-volatile storage of data and as an over-flow data storage device if RAM 508 is not large enough to hold all working data. Secondary storage 504 may be used to store programs which are loaded into RAM 508 when such programs are selected for execution. The ROM 506 is used to store instructions and perhaps data which are read during program execution. ROM 506 is a non-volatile memory device which typically has a small memory capacity relative to the larger memory capacity of secondary storage 504. The RAM 508 is used to store volatile data and perhaps to store instructions. Access to both ROM 506 and RAM 508 may be faster than to secondary storage 504. The secondary storage 504, the RAM 508, and/or the ROM 506 may be referred to in some contexts as computer readable storage media and/or non-transitory computer readable media.

The processor 502 executes instructions, codes, computer programs, scripts which it accesses from the secondary storage 504, the ROM 506, or the RAM 508. While only one processor 502 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 504, the ROM 506, and/or the RAM 508 may be referred to in some contexts as non-transitory instructions and/or non-transitory information.

In some contexts, the secondary storage 504, the ROM 506, and the RAM 508 may be referred to as a non-transitory computer readable medium or a computer readable storage media. A dynamic RAM embodiment of the RAM 508, likewise, may be referred to as a non-transitory computer readable medium in that while the dynamic RAM receives electrical power and is operated in accordance with its design, for example during a period of time during which the device 500 is powered up and operational, the dynamic RAM stores information that is written to it. Similarly, the processor 502 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An indicator ambient electromagnetic power harvesting (AEPH) device, comprising:
- a substrate, having fabricated thereon:
  - an antenna;
  - an AEPH circuit coupled to the antenna and configured to receive radio frequency (RF) energy collected by the antenna and to convert the RF energy into electrical power;
  - a controller configured to receive the electrical power from the AEPH circuit and an RF signal from the antenna;
  - a physical indicator configured to be controlled by the controller; and
  - an indicator control data (ICD) memory coupled to the controller,
- wherein the controller is configured to:
  - receive information from an RF signal received via the antenna, the information comprising interrogation data;
  - compare data stored in the ICD memory with the interrogation data to generate comparison information; and
- cause the physical indicator to emit a physical signal, based on the comparison information;
- wherein comparing the data stored in the ICD memory with the interrogation data comprises calculating a value of a similarity metric between the data stored in the ICD memory and the interrogation data; and
- wherein a physical characteristic of the physical signal is based on the value of the similarity metric.

2. The indicator AEPH device of claim 1, wherein:
- the physical indicator is a light-emitting device and the physical signal comprises light emitted by the light-emitting device; and
- a brightness of the light emitted by the light-emitting device is based on the comparison information.

3. The indicator AEPH device of claim 1, wherein;
- the physical indicator is a light-emitting device and the physical signal comprises light emitted by the light-emitting device; and a color of the light emitted by the light-emitting device is based on the comparison information.

4. The indicator AEPH device of claim 1, wherein the physical indicator is a light-emitting device comprising a plurality of emitters, the physical signal comprises light emitted by a selected number of emitters of the plurality of emitters, and the selected number is based on the comparison information.

5. The indicator AEPH device of claim 1, wherein the data stored in the ICD memory comprises a plurality of data items and the similarity metric is based on a determination that the interrogation data matches one of the data items.

6. The indicator AEPH device of claim 1, wherein:

the interrogation data comprises a first plurality of first data items and the data stored in the ICD memory comprises a second plurality of second data items; and the similarity metric is based on a number of first data items that match second data items.

7. An indicator ambient electromagnetic power harvesting (AEPH) device, comprising:

a substrate, having fabricated thereon:

a first antenna;

a first AEPH circuit coupled to the first antenna and configured to receive first radio frequency (RF) energy collected by the first antenna and convert the first RF energy into first electrical power;

a controller configured to receive the first electrical power from the first AEPH circuit and an RF signal from the first antenna; and an indicator control data (ICD) memory coupled to the controller;

a physical indicator configured to be controlled by the controller, wherein the controller is configured to:

receive information from an RF signal received via the first antenna, the information comprising interrogation data;

compare data stored in the ICD memory with the interrogation data to generate comparison information; and cause the physical indicator to emit a physical signal, based on the comparison information;

wherein the physical indicator comprises an audio transducer and the physical signal comprises a sound emitted by the audio transducer; and wherein a frequency of the sound is based on the comparison information.

8. The indicator AEPH device of claim 7, wherein a modulation of the frequency of the sound is based on the comparison information.

9. A method of responding to a radio signal by an indicator ambient electromagnetic power harvesting (AEPH) device, the method comprising:

receiving, by a controller of an indicator AEPH, a radio frequency (RF) signal, the RF signal comprising interrogation data;

comparing, by the controller, the interrogation data with data stored in an indicator control data (ICD) memory coupled to the controller to generate comparison information; and causing, by the controller, a physical indicator coupled to the controller to emit a physical signal, where a physical characteristic of the physical signal is based on the comparison information, wherein the comparison information comprises a value of a similarity metric calculated based on the ICD and the interrogation data; and the physical characteristic of the physical signal is based on the value of the similarity metric.

10. The method of claim 9, wherein the ICD comprises a plurality of data items and the value of the similarity metric is based on a determination that the interrogation data matches one data item of the plurality of data items.

11. The method of claim 9, wherein:

the interrogation data comprises a first plurality of first data items and the ICD comprises a second plurality of second data items; and the value of the similarity metric is based on a number of first data items that match second data items.

12. The indicator AEPH device of claim 1, wherein:

the physical indicator comprises an audio transducer and the physical signal comprises a sound emitted by the audio transducer; and a frequency of the sound is based on the comparison information.

13. The indicator AEPH device of claim 1, further comprising:

a second antenna; and a second AEPH circuit coupled to the second antenna and configured to receive second RF energy collected by the second antenna and convert the second RF energy into second electrical power, wherein the physical indicator is configured to be powered by the second AEPH circuit.

14. The indicator AEPH device of claim 4, wherein the physical signal has a bit depth equaling the selected number of emitters.

15. The indicator AEPH device of claim 7, further comprising:

a second antenna; and a second AEPH circuit coupled to the second antenna and configured to receive second RF energy collected by the second antenna and convert the second RF energy into second electrical power, wherein the physical indicator is configured to be powered by the second AEPH circuit.

16. The indicator AEPH device of claim 15, wherein:

the first RF energy is received in a first RF frequency range; and the second RF energy is received in a second RF frequency range.

17. The indicator AEPH device of claim 16, wherein the second RF energy has a higher RF power level than the first RF energy.

18. The indicator AEPH device of claim 7, wherein:

the physical indicator is a light-emitting device comprising a plurality of emitters;

the physical signal comprises light emitted by a selected number of emitters of the plurality of emitters;

the selected number is based on the comparison information; and the physical signal has a bit depth equaling the selected number of emitters.

19. The method of claim 9, wherein:

the physical indicator comprises an audio transducer and the physical signal comprises a sound emitted by the audio transducer; and a frequency of the sound is based on the comparison information.

20. The method of claim 9, wherein:

the physical indicator is a light-emitting device comprising a plurality of emitters;

the physical signal comprises light emitted by a selected number of emitters of the plurality of emitters;

the selected number is based on the comparison information; and the physical signal has a bit depth equaling the selected number of emitters.

* * * * *